US008722775B2

(12) United States Patent
Kim et al.

(10) Patent No.: US 8,722,775 B2
(45) Date of Patent: May 13, 2014

(54) ENVIRONMENTALLY FRIENDLY CABLE

(75) Inventors: Seok Ki Kim, Goyang (KR); Thomas H. Perszyk, Mason, OH (US)

(73) Assignee: Samsin USA, LLC, Mason, OH (US)

( * ) Notice: Subject to any disclaimer, the term of this patent is extended or adjusted under 35 U.S.C. 154(b) by 1097 days.

(21) Appl. No.: 12/722,586

(22) Filed: Mar. 12, 2010

(65) Prior Publication Data
US 2011/0158455 A1 Jun. 30, 2011

(30) Foreign Application Priority Data
Dec. 30, 2009 (KR) .................. 10-2009-0134276

(51) Int. Cl.
| C08L 3/02 | (2006.01) |
| C08L 23/12 | (2006.01) |
| C08L 23/06 | (2006.01) |
| C08L 25/10 | (2006.01) |
| C08L 53/00 | (2006.01) |
| C08L 53/02 | (2006.01) |
| H04R 1/10 | (2006.01) |
| H01B 3/30 | (2006.01) |

(52) U.S. Cl.
CPC . *C08L 3/02* (2013.01); *C08L 23/12* (2013.01); *C08L 23/06* (2013.01); *C08L 25/10* (2013.01); *C08L 53/00* (2013.01); *C08L 53/02* (2013.01); *H04R 1/1033* (2013.01); *H01B 3/307* (2013.01); *C08L 2555/84* (2013.01)
USPC ............................................ 524/47; 156/51

(58) Field of Classification Search
CPC ........... C08L 3/02; C08L 23/12; C08L 23/06; C08L 25/10; C08L 53/00; C08L 53/02; C08L 2555/84; H04R 1/1033; H01B 3/307
USPC ............................................... 524/47; 156/51
See application file for complete search history.

(56) References Cited

U.S. PATENT DOCUMENTS

| 5,026,745 A | 6/1991 | Weil |
| 5,212,219 A * | 5/1993 | Griffin ........................... 524/17 |
| 2005/0288399 A1 * | 12/2005 | Chen ............................... 524/47 |
| 2008/0153941 A1 | 6/2008 | Fournier et al. |

FOREIGN PATENT DOCUMENTS

| JP | 2004311063 A * | 11/2004 |
| WO | 9102757 A1 | 3/1991 |
| WO | 9115542 A1 | 10/1991 |
| WO | 2009043580 A1 | 4/2009 |

OTHER PUBLICATIONS

Ouhadi, T., et al. "Thermoplastic Elastomers," Ullmann's Encyclopedia of Industrial Chemistry, vol. 36, pp. 453-491, published online Jun. 2004.*
Holman, H.-Y. N., et al., "Catalysis of PAH Biodegradation by Humic Acid Shown in Synchrotron Infrared Studies," Environ. Sci. Technol., 2002, 36, 1276-1280.*
Nakiri, T., et al., "Developmen of Electric Wire Using Biodegradable Polymer," IEEE Trans. Indust. Appl., 2007, 43, 1069-1074.*
Machine translation of JP2004-311063. Performed on JPO website on Nov. 29, 2013.*

(Continued)

*Primary Examiner* — Melissa Rioja
*Assistant Examiner* — Nicholas Hill
(74) *Attorney, Agent, or Firm* — Wood, Herron & Evans, LLP

(57) ABSTRACT

A biodegradable plastic is provided by mixing starch; a biodegradation promoter, such as humic and/or fulvic acid; oil, such as white mineral oil; polypropylene; and a hydrogenated styrene isoprene/butadiene block copolymer. An environmentally friendly cable is provided by extruding the biodegradable plastic with wiring therein. An environmentally friendly headset includes the environmentally friendly cable, and may also includes one or more speaker sets and a microphone assembly, each also made, at least in part, with biodegradable material.

16 Claims, 4 Drawing Sheets

(56) References Cited

OTHER PUBLICATIONS

International Search Report and Written Opinion from counterpart PCT Application No. PCT/US2010/059698 mailed on Feb. 25, 2011 (11 pages).
Graaf et al, "The Production of a New Partially Biodegradable Starch Plastic by Reactive Intrusion", Polymer Engineering and Science, Brookfield Center, US., vol. 40, No. 9, Sep. 1, 2000, pp. 2086-2094.
Song et al, "Biodegradable and Compostable Alternatives to Conventional Plastics", Philosophical Transactions of the Royal Society of London B Biological Sciences, vol. 364, No. 1526, Jul. 2009, pp. 2127-2139.
Mooney, "The Second Green Revolution? Production of Plant-Based Biodegradable Plastics", Biochemical Journal, The Biochemical Society, London, GB, vol. 418, No. 2, Mar. 1, 2009, pp. 219-232.
Gross and Kalra, Biodegradable Polymers for the Environment, Science, vol. 297, Aug. 2, 2002 p. 803-807.
Wikipedia, Starch, printed Feb. 19, 2010 (9 pages).
Wikipedia, Humic acid, printed Feb. 19, 2010 (4 pages).
Wikipedia, Cellulose, printed Feb. 19, 2010 (7 pages).
EcolBioTech Co., Ltd, EcolGreen Bio-Polymer, Material Safety Data Sheet—for injection, Rev. Sep. 11, 2009 (11 pages).

* cited by examiner

ENVIRONMENTALLY FRIENDLY CABLE

FIELD OF THE INVENTION

The present invention relates to biodegradable plastics, environmentally friendly cables made therewith, and environmentally friendly headsets.

BACKGROUND OF THE INVENTION

Vast arrays of products are made with synthetic polymers, also referred to as synthetic resin or plastic. For example, most headsets, such as those used for electronic devices like cellular phones and portable music players, have one or more cables (also referred to as earphone cords) and speaker sets that are formed from molded and/or extruded plastic. The cable is made from extruded plastic with one or more wires therein. At one end of the cable is a connector, such as a jack for connection to the electronic device. The connector is overmolded to that end of the cable with plastic, and a strain relief, also of plastic, is provided thereat. The other end of the cable may be coupled directly to a speaker set, or to a junction at which a pair of further cables split off to couple to a pair of speaker sets (one for each ear). The connection to the speaker set(s) may also include a strain relief which is typically made of plastic. The wiring in the cable is thus provided to electrically couple the speaker set(s) to the connector, which in turn can be coupled to the electronic device which delivers the audio to the speaker set(s) therethrough.

Headsets for communication devices, such as cellular telephones, might also have an intermediate microphone assembly along the cable, or one of the pair of cables. The microphone includes a plastic housing and a plastic switch knob, and may also include plastic strain reliefs at each end of the microphone through which the cable connects thereto.

Plastics are relatively inexpensive, lightweight, and possess desirable physical characteristics. But plastics also tend to maintain their state for long periods of time, often measured in decades or more, and so present environmental concerns, especially in light of the modern tendency to simply discard plastic products after use. Many of these products end up in the environment, where they can present hazards to human, animal, or fish life. Landfills are also used as a repository for disposal, but that is not only environmentally undesirable, it is also expensive. Some plastic products are incinerated, but that, too, presents environmental concerns and expense. Finally, some plastic products are recyclable, but recycling is often overlooked or considered too expensive.

One solution to these problems is to employ polymers which are naturally degradable. Degradable polymers are divided into two general classes of photodegradable and biodegradable. Photodegradable polymers degrade when exposed to light, such as sunlight, while biodegradable polymers degrade when exposed to certain microorganisms and humic acid in soil. It has been proposed to create a biodegradable polymer by adding biodegradable materials, such as starch, to the synthetic resin. But the addition of such materials to the resin can change the performance of the polymer which might adversely affect the physical characteristics of the plastic products made therefrom rendering them undesirable or unsuitable for their intended use. The situation is particularly acute for cables, which by their very nature are intended to be flexible, yet durable.

SUMMARY OF THE INVENTION

The present invention provides a biodegradable plastic which has the desired physical characteristics of cable made from non-biodegradable plastics currently available, and which can be used to make environmentally friendly cables and related, flexible components, such as are used for headsets or other electronic devices. Examples include overmolding for connectors and strain reliefs.

The present invention also provides an environmentally friendly headset which includes cable made of the biodegradable plastic. Other plastic components of the headset can be made more environmentally friendly as well, such as by making the microphone housing and switch button and/or part of the speaker set of biodegradable plastics. In some situations, the speaker set parts may be made of naturally occurring biodegradable material, such as wood.

In accordance with one aspect of the present invention, a biodegradable plastic is provided by mixing starch, a biodegradation promoter, such as humic acid and/or fulvic acid, oil, such as mineral oil, polypropylene, and a hydrogenated styrene isoprene/butadiene block copolymer. The biodegradable plastic may further include such inert items as colorants or dyes. The mixture thus produced may be in pellet form, and may be extruded at high temperature to form an extrudate with one or more wires therein to create an environmentally friendly cable in accordance with the principles of the present invention. During the extrusion, ink or other colorant material may also be added, such as to provide a color stripe or color appearance to the cable. The cable can be used for a variety of audio, electrical, and/or electronic purposes, depending upon the particular wiring employed, and the device(s) coupled to respective ends of one or more lengths of such cable.

The biodegradable plastic mixture may include about 27 to about 33 wt % of starch; about 0.9 to about 1.1 wt % of a biodegradation promoter, such as humic acid or fulvic acid; about 18 to about 22 wt % of oil, such as mineral oil; about 13 to about 17 wt % of polypropylene; and about 30 to about 37 wt % of a hydrogenated styrene isoprene/butadiene block copolymer. The biodegradable plastic mixture is advantageously about 30 wt % of starch, about 1 wt % of humic acid, about 20 wt % of white mineral oil, about 15% wt of polypropylene, and about 34% wt of a hydrogenated styrene isoprene/butadiene block copolymer. The wt % is based on a total weight of the biodegradable plastic composition. Moreover, the wt % given may be precise, or may be an approximation, the latter to account for variations in the materials and/or to allow for additional trace amounts of other materials and/or inclusion of dyes, colorants, stabilizers and the like.

The plastic of the present invention may also be extruded or molded to create other flexible products as might be used, for example, in headsets, such as overmoldings and strain reliefs. Thus, a speaker set may be coupled to one end of such a cable (or two speaker sets to ends of a pair of such cables) along with such a strain relief. Also, a connector, such as a jack, may be overmolded with the plastic of the present invention, with another such strain relief at another other end of such a cable. Where a cable is joined to a pair of cables at a junction, the junction may be molded as a strain relief of the plastic of the present invention. Further, where a length of cable is to be tie-wrapped, such as for shipment or convenience, the tie-wrap may be extruded with the plastic of the present invention along with a tie-wire therein.

The cable and other flexible components of the plastic of the present invention are thus environmentally friendly, as they include a biodegradable material with the synthetic resin so as to be degradable by microorganisms, but without adversely affecting the physical characteristics of the cable or other flexible components for their intended purpose(s).

In another aspect, a microphone assembly includes a housing and a switch button. The shells of the microphone housing and/or the switch button may be injection molded with a rigid-forming biodegradable plastic. The microphone assembly housing can be coupled along or to an end of a cable of the present invention, with one or more strain reliefs, such as for use with a cellular telephone or other communication device, the strain relief being of the plastic of the present invention.

In a yet further aspect of the present invention, a headset, which may employ one or more cables of the present invention, may include biodegradable materials, such as biodegradable plastic and/or naturally occurring biodegradable material such as wood to thus contribute to the environmentally friendly nature of the headset. To that end, a speaker set typically includes a plastic speaker housing. In accordance with this further aspect of the present invention, the speaker housing is made of a rigid-forming biodegradable plastic. Alternatively, the speaker housing may be made of naturally occurring biodegradable material, such as wood. Further, the cable connected to the speaker set at the strain relief may include a decorative tube thereat, which is advantageously made of either rigid-forming biodegradable plastic or naturally occurring biodegradable material, such as wood, to provide the same advantages as in the case of the speaker housing.

By virtue of the foregoing, there is thus provided a biodegradable plastic which can be used to make environmentally friendly cables and related, flexible components, such as are used for headsets or other electronic devices, with the cable having desired physical characteristics comparable to cable made from non-biodegradable plastics currently available. There is thus also provided an environmentally friendly headset which includes cable made of the biodegradable plastic, and with other plastic components of the headset made more environmentally friendly. These and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF THE DRAWINGS

Figure 1:
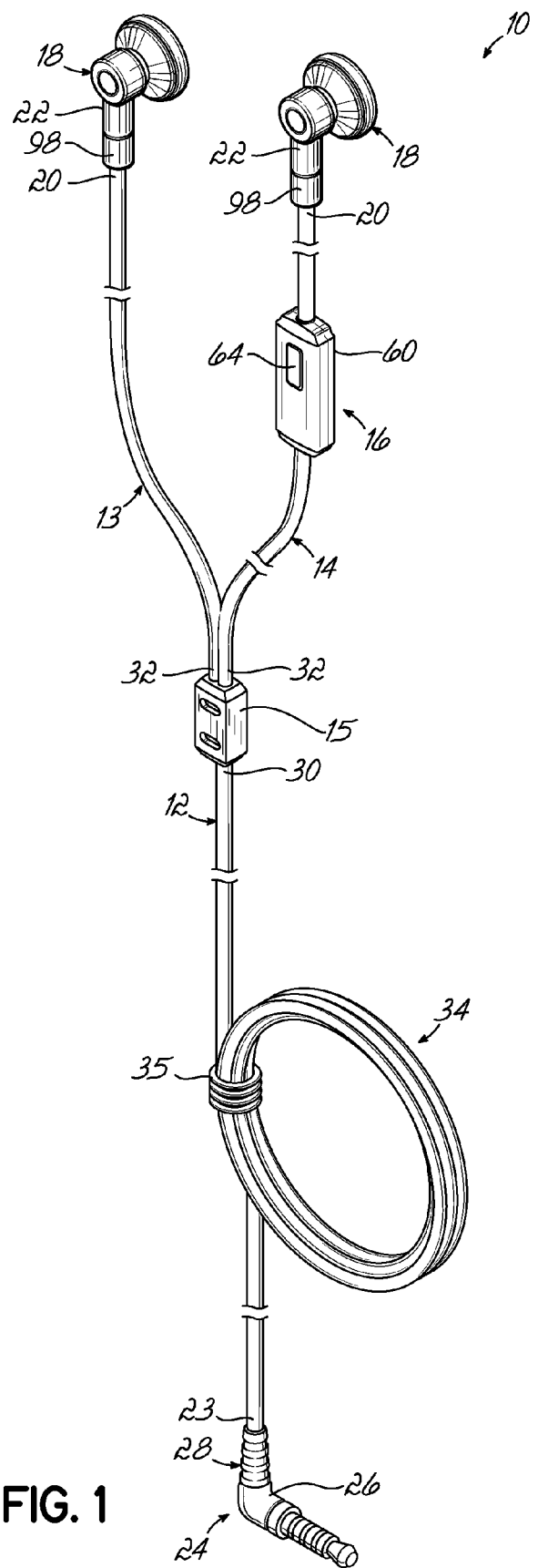
FIG. 1 is a perspective view of an exemplary embodiment of environmentally friendly headset including embodiments of environmentally friendly cable, an environmentally friendly microphone assembly, and environmentally friendly speaker sets in accordance with various principles of the present invention.

With reference to FIG. 1, there is shown an environmentally friendly headset 10 including a first environmentally friendly cable 12, second and third (i.e., a pair of) environmentally friendly cables 13 and 14 coupled to cable 12 at junction 15, an environmentally friendly microphone assembly 16 associated with cable 14, and a pair of environmentally friendly speaker sets 18 at the respective ends 20 of cables 13 and 14 along with a respective strain relief 22. Cable 12 couples at end 23 to an electrical connector or jack 24, which is overmolded as at 26 and includes a strain relief 28. Cable 12 is also coupled at opposite end 30 to junction 15. Each of the pair of cables 13 and 14 is coupled at its respective end 32 to junction 15 as well. Junction 15 thus serves as a protective housing for the wires (not shown) of the cables 12, 13 and 14 to be joined and protected as if coupled with a strain relief, and to electrically couple speaker sets 18, and microphone assembly 16, to cable 12, and particularly end 30 thereof.

Microphone assembly 16 associated with cable 14 so as to be electrically coupled therewith may also include strain reliefs (not shown) at each end where cable 14 enters or exits the assembly. Also, cable 12 may be looped for storage or convenience as at 34 and held together with a tie-wrap 35.

Figure 3:
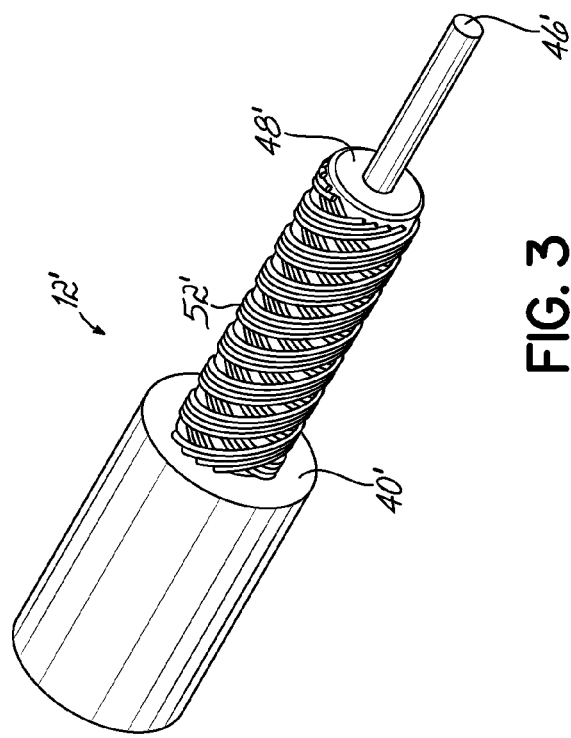
FIG. 3 is a view like FIG. 2 of portion of an alternative embodiment of an environmentally friendly cable in accordance with the principles of the present invention.
Figure 2:
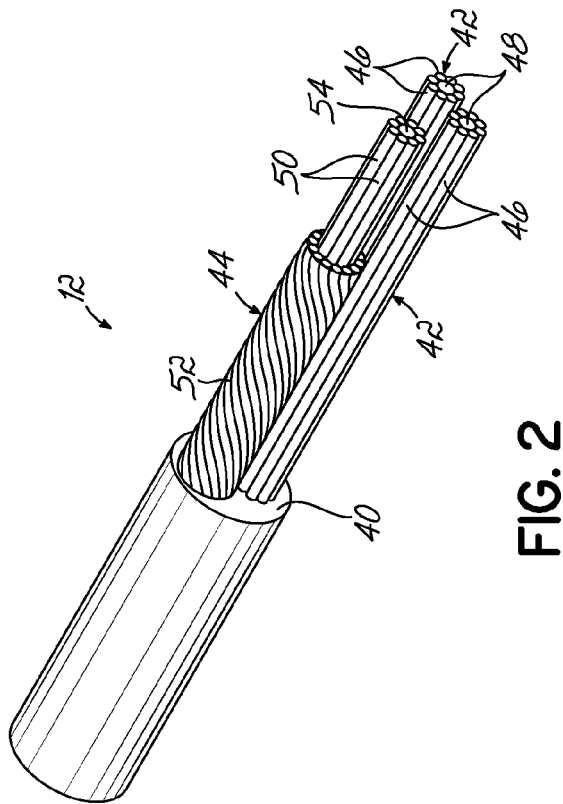
FIG. 2 is an enlarged, partially cut-away view of a portion of one of the environmentally friendly cables of FIG. 1 for purposes of explaining an aspect of the present invention.

The cables 12, 13, and 14, the junction 15, the strain reliefs, such as 22 and 28, and the tie-wrap 35 may be formed with the biodegradable plastic of the present invention so as to be environmentally friendly. With reference to FIG. 2, cable 12 may be formed by extruding biodegradable plastic of the present invention to form the main insulating body 40 thereof, along with the necessary wiring such as wires 42 and/or wrapped wire 44 as required for the particular application, to provide an environmentally friendly cable 12. To that end, wires 42 may be comprised of a plurality of elongated strands of enamel coated copper wire 46 and Kevlar® thread 48 to provide tensile strength. The wrapped wire 44 may be comprised of enamel coated copper wire 50 and braided shielding wire 52, along with Kevlar® thread 54. Cable 12 is shown in a form as might be used for cellular phone headset 10, but the cable may take other forms, one example 12' of which is shown in FIG. 3. To that end, in FIG. 3, cable 12' is again extruded of biodegradable plastic of the present invention to form insulating body 40' along with wiring such as inner wire conductor 46', insulating cover 48' (which may be of Teflon®) thereabout, and surrounding braided shielding wire 52'. Cable 13 may be like cable 12 but with only sufficient wiring for powering a speaker set 18, while cable 14 may be like cable 12 but with enough wiring to power a speaker set 18 and microphone assembly 16, as will be understood by those skilled in the headset art.

Figure 4:
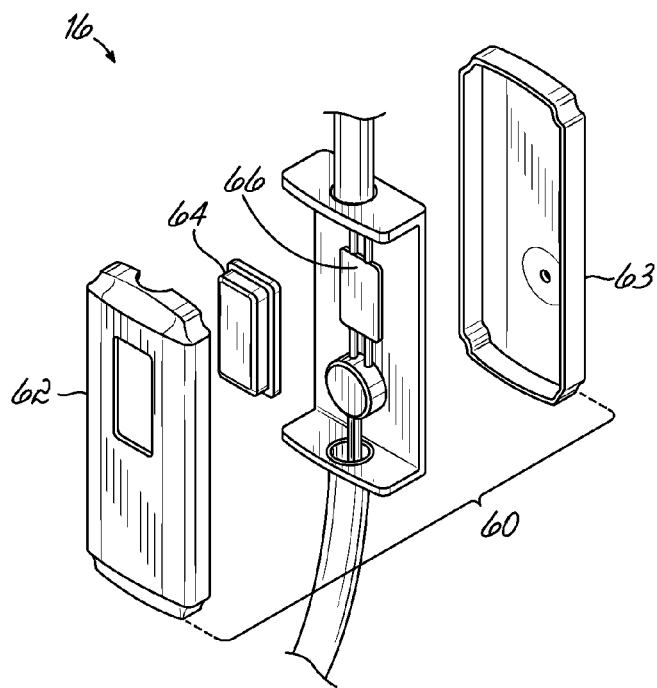
FIG. 4 is an enlarged, exploded view of a portion of FIG. 1 showing the environmentally friendly microphone assembly coupled to one of the environmentally friendly cables of FIG. 1 for purposes of explaining a further aspect of the present invention.

With reference to FIG. 4, microphone assembly 16 includes a microphone housing 60 defined by front and rear shells 62, 63. Microphone assembly 16 also includes a switch knob 64 used to selectively activate the electronics 66 of assembly 16. To enhance the environmentally friendly nature of headset 10 in accordance with an aspect of the invention, shells 62, 63 and/or switch knob 64 may be formed with a rigid-forming biodegradable plastic, one example of which is EcolGreen Bio-Polymer (EGN or EGP) available from Ecol-Bio Tech Co. Ltd., 121B0-2L, Namdong Industrial Complex, 691-1, Gojan-dong, Namdong-gu, Incheon, South Korea. The rigid-forming plastic is to be distinguished from the flexible-forming biodegradable plastic of the present invention and used to make the cables 12, 13 and 14.

Figure 5:
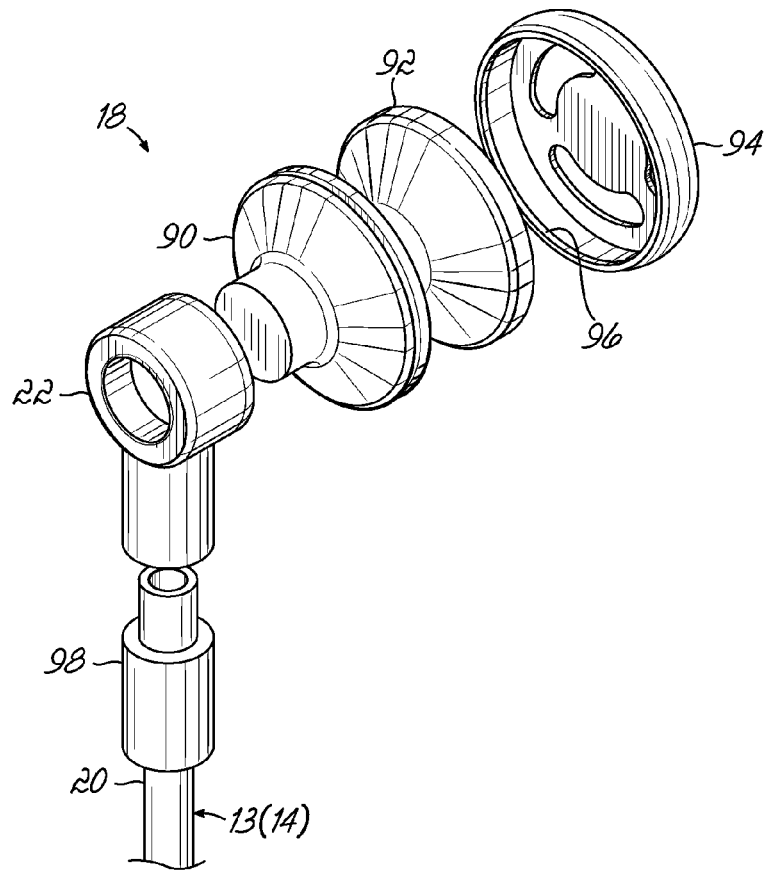
FIG. 5 is an enlarged, exploded view of a portion of FIG. 1 showing one of the environmentally friendly speaker sets coupled to one of the environmentally friendly cables of FIG. 1 for purposes of explaining a yet further aspect of the present invention.

With reference to FIG. 5, speaker set 18 may include a speaker housing 90 supporting a speaker 92 and secured thereto by a cap 94 with an O-ring 96. A foam cushion (not shown) may overlie cap 94. Cable 13 (or cable 14) is coupled to speaker 92 through strain relief 22. A decorative tube 98 may be provided thereat as well. Typically, the speaker housing, strain relief, and decorative tube of a speaker set would be formed of standard, non-biodegradable plastic. In order to render the speaker set 18 more environmentally friendly than one made from non-biodegradable plastic, the speaker housing 90 and decorative tube 98 may instead be formed of rigid-forming biodegradable plastic, such as the aforementioned EcoGreen Bio-Polymer (EGN or EGP) from EcoBio Tech Co. Ltd. Additionally or alternatively, the speaker housing 90 and/or decorative tube 98 may be of naturally occurring biodegradable material, such as wood. The wood may be ebony or black walnut, by way of example, and may be finished with lacquer or palm oil, if desired.

Figure 6:
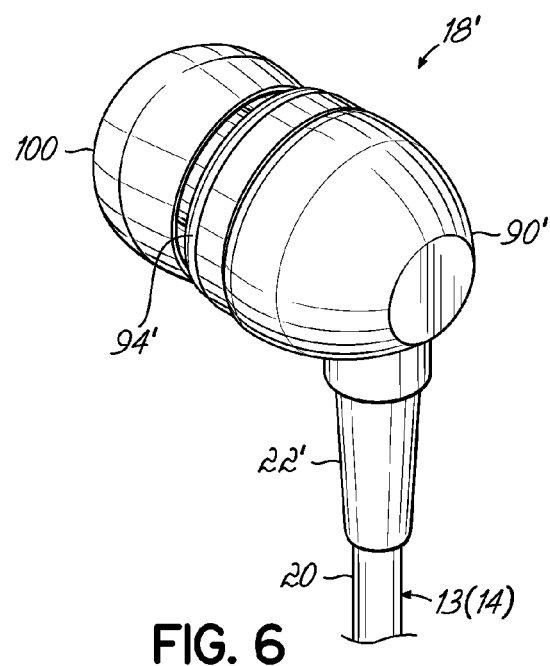
FIG. 6 is perspective view of an alternative embodiment of an environmentally friendly speaker set in accordance with the present invention.
Figure 7:
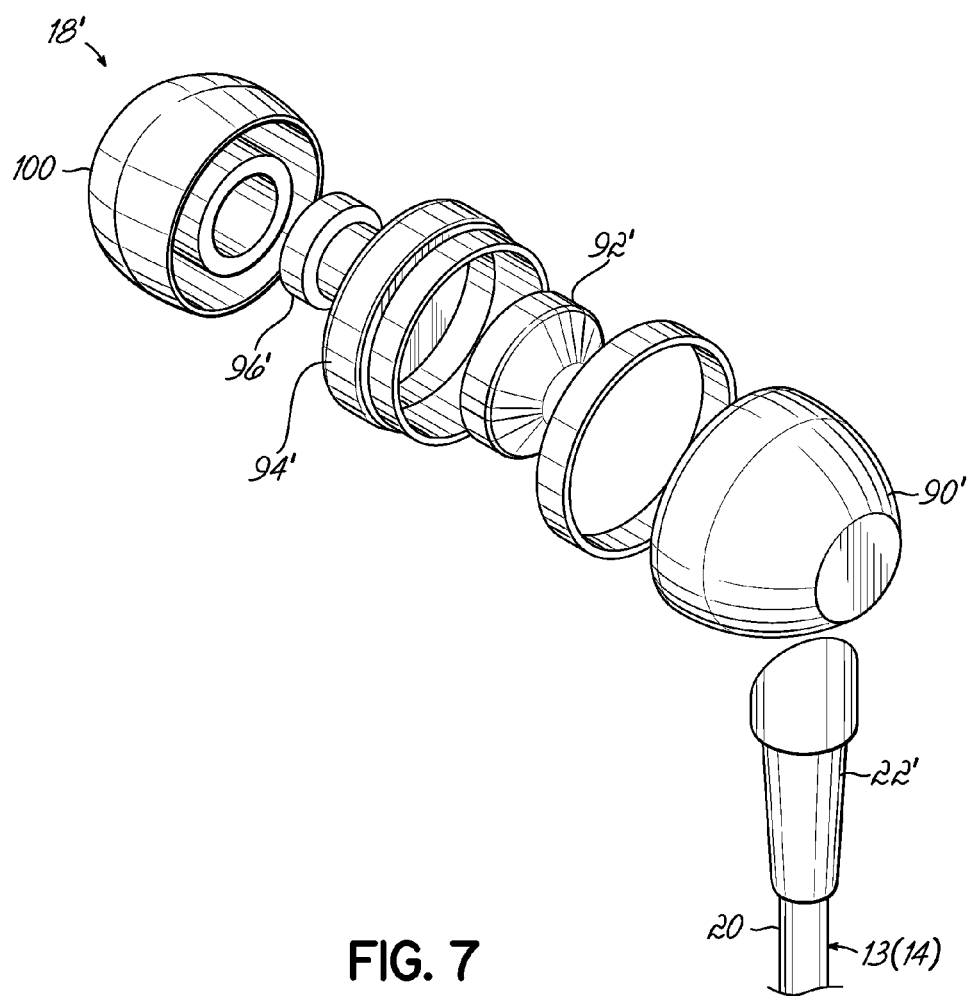
FIG. 7 is an exploded view of the speaker set of FIG. 6.

Speaker sets 18 as shown in FIGS. 1 and 5 are considered to be of the open type in that the speaker housing 90 and cap 94 are sized to fit over, but not into, the ear canal (not shown). Alternatively, speaker sets may be of the closed type sized to fit into the ear canal (not shown), such as speaker set 18' shown in FIGS. 6 and 7. Speaker set 18' couples to cable 13 (or 14) via strain relief 22', which is advantageously of biodegradable plastic of the present invention. Speaker set 18' may include a speaker housing 90' supporting speaker 92' and secured thereto by a cap 94' with an O-ring 96'. An ear plug or ear gel 100 is mounted on speaker cap 94'. A cushion (not shown) may overlie ear plug or ear gel 100, and may be of silicone or biodegradable material. Speaker housing 90', speaker 92', cap 94', O-ring 96', and ear plug or ear gel 100 are sized to fit within the ear canal (not shown). In order to be environmentally friendly, at least the speaker housing 90' of speaker set 18' may be made of a rigid-forming biodegradable plastic or naturally occurring biodegradable material, such as wood, instead of conventional plastic, as described above in relation to speaker housing 90 of speaker set 18.

In accordance with one aspect of the present invention, a biodegradable plastic suitable for forming environmentally friendly cables, such as cables 12, 12', 13 and/or 14, is provided by mixing starch; biodegradation promoter, such as humic acid and/or fulvic acid; oil, such as mineral oil; polypropylene; and a hydrogenated styrene isoprene/butadiene block copolymer. The biodegradable plastic may further include such inert items as colorants or dyes. The mixture thus produced may be in pellet form, and may be extruded (and is thus an extrudate) at high temperature with wiring (such as one or more of wires 42 and/or 44) therein to create an environmentally friendly cable, which may be cut into desired lengths as cables 12, 13, and 14 for example, in accordance with the principles of the present invention. During the extrusion, ink or other colorant material may also be added, such as to provide a color stripe or color appearance to the cable. The cable can be used for a variety of audio, electrical, and/or electronic purposes, depending upon the particular wiring employed, and the device(s) coupled to respective ends of one or more lengths of such cable. The mixture may also be extruded or molded at high temperature to form the junction 15, strain reliefs 22, 22', and 28, and/or the tie-wrap 35.

The biodegradable plastic mixture may include about 27 to about 33 wt % of starch; about 0.9 to about 1.1 wt % of a biodegradation promoter, such as humic acid, fulvic acid or combinations thereof; about 18 to about 22 wt % of oil, such as mineral oil; about 13 to about 17 wt % of polypropylene; and about 30 to about 37 wt % of a hydrogenated styrene isoprene/butadiene block copolymer. The biodegradable plastic mixture is advantageously about 30 wt % of starch, about 1 wt % of humic acid, about 20 wt % of white mineral oil, about 15% wt of polypropylene, and about 34% wt of a hydrogenated styrene isoprene/butadiene block copolymer. The wt % is based on a total weight of the biodegradable plastic composition. Moreover, the wt % given may be precise, or may be an approximation, the latter to account for variations in the materials and/or to allow for additional trace amounts of other materials and/or inclusion of dyes, colorants, stabilizers and the like.

The mixing of the components is advantageously continued until a homogeneous mixture thereof is formed into a paste. The paste is pressed into a flat sheet and cut into pellet-sized pieces. The pellets are extruded to form environmentally friendly plastic products, such as cables 12, 13, and 14, or the like. Dye could be added to the mixture while the paste is being formed. Alternatively or additionally, the pellets can be commingled with solid, dye coloring pieces, and then extruded.

Advantageously, the starch, which is a biodegradable polysaccharide, is selected from the group consisting of corn, potato, wheat, and sweet potato or a mixture of two or more thereof. Further advantageously, the starch is dry and ground into a powder form for the mixture. Also advantageously, the biodegradation promoter is humic acid, which is a yellowish brown or dark brown, acidic polymer material. The humic acid is also advantageously amorphous, promotes the absorption of fertilizers or trace elements and the release of soil nutrients, performs catalysis, and also functions as a buffer of additives. In other words, the humic acid plays a role in promoting the biodegradability of the plastic, and the environmentally friendly products made therefrom, in accordance with the principles of the present invention. Other biodegradation promoters may be used, however, such as fulvic acid. For example, fulvic acid may be used as a replacement for or in combination with humic acid. The oil, which performs as a mixing aid and a softening agent, may include any oil where its properties work with the other ingredients to form an extruded, environmentally friendly cable with the desired physical characteristics. Advantageously, the oil is a mineral oil, such as a white mineral oil, which is commonly understood to be derived from naphthenic oil or paraffinic oil.

Table I below sets forth a summary of exemplary conditions for extruding a uniform mixture of solid, dye coloring pieces and pellet resin of a biodegradable plastic having 30 wt % of starch, 1 wt % of humic acid, 20 wt % of white mineral oil, 15% wt of polypropylene, and 34% wt of a hydrogenated styrene isoprene/butadiene block copolymer to make an environmentally friendly cable of the present invention. The extrusion temperature ranges from 80° C. to 150° C. (±3° C.) over 10 zones, wherein the temperature for each zone of the production process is provided in the 10 zone temperature chart below. In the fabrication process, a cable, such as cable 12, is stretched as it proceeds through the extruder from 50 to 100 feet.

TABLE 1

| Production conditions (main engine RPM: 330 rpm; transmission RPM: 25 rpm; and inlet temperature: 130° C.) | | | | | | | | | | | |
|---|---|---|---|---|---|---|---|---|---|---|---|
| | Zone temperatures (° C.) | | | | | | | | | | |
| System | I | II | III | IV | V | VI | VII | VIII | IX | X | Tolerance range |
| Set values | 80 | 150 | 150 | 150 | 150 | 150 | 150 | 145 | 135 | 135 | Temp.: ±3° C.; Main engine RPM: ±20 rpm; transmission RPM: ±10 rpm |

While past experience may suggest that addition of starch to synthetic polymers has an adverse effect on the physical characteristics of the end product, the present invention provides a biodegradable plastic that does not exhibit the adverse effects so that the prepared biodegradable plastics are not seen as having material differences in their performance as compared to standard, non-biodegradable plastic.

Tests are carried out in order to evaluate the change, if any, in the performance of cable 12 produced with the pellet resin as described in relation to Table I and to examine whether cable 12 is suitable for use in an environmentally friendly headset 10. The Tables below summarize results of those performance tests.

Performance tests include a high-temperature and high-humidity test, a high-temperature storage test, a low-temperature storage test, a migration test, a tensile strength test, and a bending test.

High-Temperature and High-Humidity Test

TABLE 2

| testing conditions | | | |
|---|---|---|---|
| Test date | Nov. 27, 2009 through Nov. 28, 2009 | Measurement method | Placing the sample in the chamber at a temperature of 80° C. and a humidity of 80% and observing the sample for 24 hours. After 24 hours, examining the sample. |
| Sample stage | Sample | | |
| Testing conditions | A temperature of 80° C. and a humidity of 80% for 24 hours (1° C. ± 0.2° C./min) | | |
| Testing equipment | Chamber (Han II Eng.) | | |
| Number of samples | 3 pieces | | |

Testing Results
1. There were no electrical or mechanical defects.
2. After carrying out this test, the function of each sample was normally operated.
3. The appearance of each sample before and after the test was normal.

High-Temperature Storage Test

TABLE 3

| Testing conditions | | | |
|---|---|---|---|
| Test date | Nov. 24, 2009 through Nov. 27, 2009 | Measurement method | Placing the sample in the chamber at a temperature of 80° C. and observing the sample for 96 hours. After 24 hours, examining the sample. |
| Sample stage | Sample | | |
| Testing conditions | A temperature of 80° C. for 96 hours (1° C. ± 0.2° C./min) | | |
| Testing equipment | Chamber (Han II Eng.) | | |
| Number of samples | 3 pieces | | |

Testing Results
1. There were no electrical or mechanical defects.
2. After carrying out this test, the function of each sample was normally operated.
3. The appearance of each sample before and after the test was normal.

Low-Temperature Storage Test

TABLE 4

| Testing conditions | | | |
|---|---|---|---|
| Test date | Nov. 21, 2009 through Nov. 24, 2009 | Measurement method | Placing the sample in the chamber at a temperature of −40° C. and observing the sample for 96 hours. After 24 hours, examining the sample. |
| Sample stage | Sample | | |
| Testing conditions | A temperature of −40° C. for 96 hours (1° C. ± 0.2° C./min) | | |
| Testing equipment | Chamber (Han II Eng.) | | |
| Number of samples | 3 pieces | | |

Testing Results
1. There were no electrical or mechanical defects.
2. After carrying out this test, the function of each sample was normally operated.
3. The appearance of each sample before and after the test was normal.

Migration Test

TABLE 5

| Testing conditions | | | |
|---|---|---|---|
| Test date | Nov. 19, 2009 through Nov. 21, 2009 | Measurement method | Placing the sample together with 500 g of ABS in the chamber at a temperature of 60° C. and observing the sample for 72 hours. |
| Sample stage | Sample | | |
| Testing conditions | 500 g of acrylonitrile butadiene styrene (ABS); and a temperature of 60° C. for 72 hours (1° C. ± 0.2° C./min) | | |
| Testing equipment | Chamber (Han II Eng.) | | |
| Number of samples | 3 pieces | | |

Testing Results
1. There were no electrical or mechanical defects.
2. After carrying out this test, the function of each sample was normally operated.
3. The appearance of each sample before and after the test was normal.

Tensile Strength Test

TABLE 6

| Testing conditions | | | |
|---|---|---|---|
| Test date | Nov. 20, 2009 | Measurement method | Applying a load of 5 kg/min to the sample, and then examining the abnormality of the sample. |
| Sample stage | Sample | | |
| Testing conditions | A load of 5 kg/min | | |
| Testing equipment | Push-Pull Gage | | |
| Number of samples | 2 pieces | | |

Testing Results

1. There were no electrical or mechanical defects.
2. After carrying out this test, the function of each sample was normally operated.
3. There were no defects in the appearance of each sample.
4. The functional operation of each sample before and after the test was normal.

Bending Test

TABLE 7

| Testing conditions | | | |
|---|---|---|---|
| Test date | Nov. 20, 2009 through Nov. 24, 2009 | Measurement method | Carrying out the test after fixing the sample between clamps. Then, calculating the bending number until the indicator stops. |
| Sample stage | Sample | | |
| Testing conditions | ±90° C., 100 mm, 30 cycles/min, 300 g, and 5,000 times | | |
| Testing equipment | Bending tester | | |
| Number of samples | 5 pieces | | |

Testing Results

1. There were no electrical or mechanical defects.
2. After carrying out this test, the function of each sample was normally operated.
3. There were no defects in the appearance of each sample.
4. Bending number: 8,956 on the average→passed.

As can be seen from the above-described testing results, environmentally friendly cable 12 according to an embodiment of the present invention is confirmed as a product satisfying all the performance tests, including the high-temperature and high-humidity test, the high-temperature storage test, the low-temperature storage test, the migration test, the tensile strength test, and the bending test. The biodegradable plastic of the present invention thus is considered to provide environmentally friendly products, wherein the plastic includes a biodegradable composition added to a synthetic resin composition but the product produced therewith, such as an environmentally friendly cable 12, is degraded by microorganisms while problems with its performance are reduced or avoided.

By virtue of the foregoing, there is thus provided a biodegradable plastic which has the desired physical characteristics of cable made from non-biodegradable plastics currently available, and which can be used to make environmentally friendly cables and related, flexible components, such as are used for headsets or other electronic devices. There is thus also provided an environmentally friendly headset which includes cable made of the biodegradable plastic, and with other plastic components of the headset made more environmentally friendly.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. For example, a single cable 12, 13, or 14, could be attached at one end to a speaker set 18 or 18' and at the other end to a connector or jack 24 to provide a headset with audio for one ear only. A microphone assembly 16 could be associated with that single cable 12, 13, or 14 to further provide a microphone function. Environmentally friendly cables can be formed with the biodegradable plastic of the present invention for other uses and purposes as will be readily apparent. By way of example, a data cable can be formed and provided with a standard USB connector at one end, and a Mini or Micro USB connector at the other end. Also, as will be readily appreciated by those skilled in the art, the extrusion process can be varied to adjust flow rate(s) and temperature(s) dependent on the characteristics of the plastic mixture and desired product to be formed therefrom. The invention in its broader aspects is, therefore, not limited to the specific details, representative apparatus and method, and illustrative examples shown and described. Accordingly, departures may be made from such details without departing from the spirit or scope of the general inventive concept.

Having described the invention, what is claimed is:

1. A cable comprising:
a main insulating body comprised of an extrudate of biodegradable plastic and wiring extending therethrough, the biodegradable plastic comprising a mixture of starch, biodegradation promoter, oil, polypropylene, and a hydrogenated block copolymer from styrene monomer and isoprene monomer or butadiene monomer, wherein the biodegradable plastic mixture has been extruded with the wiring therein, the biodegradable plastic comprising about 27 to about 33 wt % of the starch; about 0.9 to about 1.1 wt % of the biodegradation promoter; about 18 to about 22 wt % of the oil; about 13 to about 17 wt % of polypropylene; and about 30 to about 37 wt % of the hydrogenated block copolymer, wherein the wt % is based on the total weight of the biodegradable plastic.

2. The cable of claim 1, the starch being selected from the group consisting of corn starch, potato starch, wheat starch, and sweet potato starch, or a mixture of two or more thereof 3. The cable of claim 1, wherein the biodegradation promoter is humic acid, fulvic acid, or a combination thereof 4. The cable of claim 1, wherein the oil is mineral oil.

5. The cable of claim 4, wherein the mineral oil is white mineral oil.

6. The cable of claim 5, wherein the biodegradation promoter is humic acid.

7. The cable of claim 1, the biodegradable plastic comprising about 30 wt % of the starch, about 0.9 to about 1 wt % of the biodegradation promoter, about 20 wt % of the oil, about 15 wt % of the polypropylene, and about 34 wt % of the hydrogenated block copolymer.

8. The cable of claim 6, the biodegradable plastic comprising about 30 wt % of the starch; about 1 wt % of the humic acid; about 20 wt % of the white mineral oil; about 15 wt % of the polypropylene; and about 34 wt % of the hydrogenated block copolymer.

9. A method of forming a cable comprising:
mixing about 27 to about 33 wt % of starch, about 0.9 to about 1.1 wt % of biodegradation promoter, about 18 to about 22 wt % of oil, about 13 to about 17 wt % of polypropylene, and about 30 to about 37 wt % of a hydrogenated block copolymer from styrene monomer and isoprene monomer or butadiene monomer to form a homogenous biodegradable plastic mixture, wherein the wt % is based on a total weight of the homogenous biodegradable plastic mixture, and
extruding the homogenous biodegradable plastic mixture at a high temperature with wiring therein.

10. The method of claim 9, wherein the biodegradation promoter is humic acid.

11. The method of claim 9, wherein the oil is mineral oil.

12. The method of claim 11, wherein the oil is white mineral oil.

13. The method of claim 12, wherein the biodegradation promoter is humic acid.

14. The method of claim 13, comprising mixing about 30 wt % of the starch; about 1 wt % of the humic acid; about 20 wt % of the white mineral oil; about 15wt % of the polypropylene; and about 34 wt % of the hydrogenated block copolymer.

15. The method of claim 9, wherein the extruding is performed over a temperature range from about 80° to about 150° C.

16. The method of claim 9, comprising mixing about 30 wt % of the starch; about 1 wt % of the biodegradation promoter; about 20 wt % of the oil; about 15 wt % of the polypropylene; and about 34 wt % of the hydrogenated block copolymer.

* * * * *